United States Patent
Yang

(10) Patent No.: US 10,132,987 B2
(45) Date of Patent: Nov. 20, 2018

(54) BACKLIGHT MODULE, LIQUID CRYSTAL DISPLAY DEVICE AND DISPLAY

(71) Applicant: BOE TECHNOLOGY GROUP CO., LTD., Beijing (CN)

(72) Inventor: Zezhou Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/207,819

(22) Filed: Jul. 12, 2016

(65) Prior Publication Data

US 2017/0205566 A1    Jul. 20, 2017

(30) Foreign Application Priority Data

Jan. 18, 2016  (CN) .......................... 2016 1 0032262

(51) Int. Cl.
  *F21V 8/00* (2006.01)
  *G02F 1/1335* (2006.01)

(52) U.S. Cl.
  CPC ......... *G02B 6/0068* (2013.01); *G02B 6/0055* (2013.01); *G02B 6/0066* (2013.01); *G02B 6/0078* (2013.01); *G02F 1/133514* (2013.01)

(58) Field of Classification Search
  CPC ............ G02F 1/133514; G02B 6/0055; G02B 6/0066; G02B 6/0068; G02B 6/0078
  See application file for complete search history.

(56) References Cited

U.S. PATENT DOCUMENTS

| | | | |
|---|---|---|---|
| 8,054,412 B2 * | 11/2011 | Yamamoto | G02B 6/0006 349/114 |
| 2007/0024976 A1 * | 2/2007 | Schluchter | G02B 5/305 359/489.17 |
| 2010/0245719 A1 | 9/2010 | Shikii et al. | |
| 2012/0262940 A1 * | 10/2012 | Miyairi | G02B 6/0038 362/602 |

(Continued)

FOREIGN PATENT DOCUMENTS

| | | |
|---|---|---|
| CN | 101109869 | 1/2008 |
| CN | 101390006 A | 3/2009 |
| CN | 101529324 A | 9/2009 |

(Continued)

OTHER PUBLICATIONS

"First office action," CN Application No. 201610032262.5 (dated Apr. 3, 2018).

*Primary Examiner* — Dung Nguyen
(74) *Attorney, Agent, or Firm* — Womble Bond Dickinson (US) LLP

(57) ABSTRACT

The embodiments of the present invention provide a backlight module, a liquid crystal display device and a display; laser is used as the light source of the backlight module, improving the utilization of light and realizing high color gamut display. The backlight module comprises a laser light source and several light guide devices provided on a light output side of the laser light source; the several light guide devices are arranged in a first direction; each light guide device comprises several light guide elements and transflective films arranged alternately in a second direction; the transflective films are configured to reflect laser from the laser light source into a third direction; the third direction is perpendicular to the first direction and the second direction.

13 Claims, 5 Drawing Sheets

(56) References Cited

U.S. PATENT DOCUMENTS

2014/0177273 A1* 6/2014 Chen .................. G02B 6/0035
362/609
2016/0349879 A1 12/2016 Wang et al.

FOREIGN PATENT DOCUMENTS

| CN | 105094460 | 11/2015 |
| TW | 201305668 | 2/2013 |
| WO | WO-2009066450 | 4/2011 |

* cited by examiner

BACKLIGHT MODULE, LIQUID CRYSTAL DISPLAY DEVICE AND DISPLAY

RELATED APPLICATIONS

The present application claims the benefit of Chinese Patent Application No. 201610032262.5, filed on Jan. 18, 2016, the entire disclosure of which is incorporated herein by reference.

FIELD OF THE INVENTION

The present invention relates to the field of display technology, particularly to a backlight module, a liquid crystal display device and a display.

BACKGROUND OF THE INVENTION

A liquid crystal display system mainly consists of a LCD panel and a backlight module. The structure of the current mainstream thin film transistor liquid crystal display (TFT-LCD) mainly comprises: a lower polarizer, an array substrate, a liquid crystal layer, a color filter substrate and an upper polarizer. The thin film transistors (TFT) in the array substrate are used for controlling the twist of the liquid crystal molecules, thereby realizing a function of an optical switch, transmitting or blocking light emitted from the light source of the backlight module. The array substrate comprises a plurality of sub-pixels arranged in an array; the color filter substrate comprises a plurality of color filters corresponding to the sub-pixels, each sub-pixel is independently controlled to realize color display.

The light source used in the backlight module of the traditional liquid crystal display system is a cold cathode fluorescent lamp (CCFL) or a light emitting diode (LED). Applying a CCFL or LED as the light source of the backlight module is a mature technology at present.

However, if CCFL is used as the light source of the backlight module, the color richness is relatively poor; color gamut range is not wide; moreover, it's not environmentally friendly due to the contained mercury. If LED is used as the light source of the backlight module, a large number of LEDs are required since an LED is approximately a point light source, resulting in high power consumption, raising the temperature of the module; if a light guide plate is used, the structure is relatively complex, and the thickness of the whole backlight module is increased.

SUMMARY OF THE INVENTION

The embodiments of the present invention provide a backlight module, a liquid crystal display device and a display; laser is used as the light source of the backlight module, improving the utilization of light and realizing high color gamut display.

An embodiment of the present invention provides a backlight module. The backlight module comprises a laser light source and several light guide devices provided on a light output side of the laser light source; the several light guide devices are arranged in a first direction; each light guide device comprises several light guide elements and transflective films arranged alternately in a second direction; the transflective films are configured to reflect laser from the laser light source into a third direction; the third direction is perpendicular to the first direction and the second direction.

In the embodiment of the present invention, a laser light source is used as the light source of the backlight module; the utilization of light is thus improved due to good directivity of laser, realizing high color gamut display, without causing defects such as cross color. Moreover, in the embodiment of the present invention, light guiding is realized by applying the light guide device with a simple structure, which light guide device is formed by connecting a light guide element with a transflective film.

Optionally, the backlight module comprises two laser light sources; the several light guide devices are provided between these two laser light sources.

Optionally, with the increase of a distance between the transflective film and the laser light source, reflectance of the transflective film increases, transmittance of the transflective film decreases.

Optionally, the higher the reflectance of the transflective film is, the greater a concentration of reflective particles contained in the transflective film is.

Optionally, the laser light source comprises a red laser light source, a green laser light source and a blue laser light source; the red laser light source comprises: at least one red semiconductor laser for emitting red laser, and several light guide elements for light source and first transflective films arranged alternately in a light emitting direction of the red semiconductor laser; the green laser light source comprises: at least one green semiconductor laser for emitting green laser, and several light guide elements for light source and second transflective films arranged alternately in a light emitting direction of the green semiconductor laser; the blue laser light source comprises: at least one blue semiconductor laser for emitting blue laser, and several light guide elements for light source and third transflective films arranged alternately in a light emitting direction of the blue semiconductor laser.

Optionally, the red laser light source, green laser light source and blue laser light source are arranged in the second direction; each one of the first transflective films, second transflective films and third transflective films corresponds to one light guide device respectively.

Optionally, the red laser light source, green laser light source and blue laser light source are arranged in the first direction; each one of the first transflective films, second transflective films and third transflective films corresponds to one light guide device respectively.

Optionally, a cross section shape of the light guide element is parallelogram; the cross section is parallel to the second direction and the third direction.

An embodiment of the present invention provides a liquid crystal display device. The liquid crystal display device comprises a liquid crystal display panel and the above mentioned backlight module; the liquid crystal display panel is provided on a light output side of the backlight module; the normal direction of the liquid crystal display panel is parallel to the third direction.

Optionally, the liquid crystal display panel comprises a plurality of sub-pixels arranged in an array; each sub-pixel corresponds to one transflective film.

Optionally, the liquid crystal display panel comprises a red color filter layer, a green color filter layer and a blue color filter layer; the laser light source is a white laser light source; the white laser light source comprises: at least one white semiconductor laser for emitting white laser, and several light guide elements for light source and fourth transflective films arranged alternately in a light emitting direction of the white semiconductor laser.

Optionally, the backlight module comprises two laser light sources; the several light guide devices are provided between these two laser light sources.

Optionally, with the increase of a distance between the transflective film and the laser light source, reflectance of the transflective film increases, transmittance of the transflective film decreases.

Optionally, the higher the reflectance of the transflective film is, the greater a concentration of reflective particles contained in the transflective film is.

Optionally, the laser light source comprises a red laser light source, a green laser light source and a blue laser light source; the red laser light source comprises: at least one red semiconductor laser for emitting red laser, and several light guide elements for light source and first transflective films arranged alternately in a light emitting direction of the red semiconductor laser; the green laser light source comprises: at least one green semiconductor laser for emitting green laser, and several light guide elements for light source and second transflective films arranged alternately in a light emitting direction of the green semiconductor laser; the blue laser light source comprises: at least one blue semiconductor laser for emitting blue laser, and several light guide elements for light source and third transflective films arranged alternately in a light emitting direction of the blue semiconductor laser.

Optionally, the red laser light source, green laser light source and blue laser light source are arranged in the second direction; each one of the first transflective films, second transflective films and third transflective films corresponds to one light guide device respectively.

Optionally, the red laser light source, green laser light source and blue laser light source are arranged in the first direction; each one of the first transflective films, second transflective films and third transflective films corresponds to one light guide device respectively.

Optionally, a cross section shape of the light guide element is parallelogram; the cross section is parallel to the second direction and the third direction.

An embodiment of the present invention also provides a display. The display comprises the above mentioned liquid crystal display device.

DETAILED DESCRIPTION OF THE INVENTION

Figure 1:
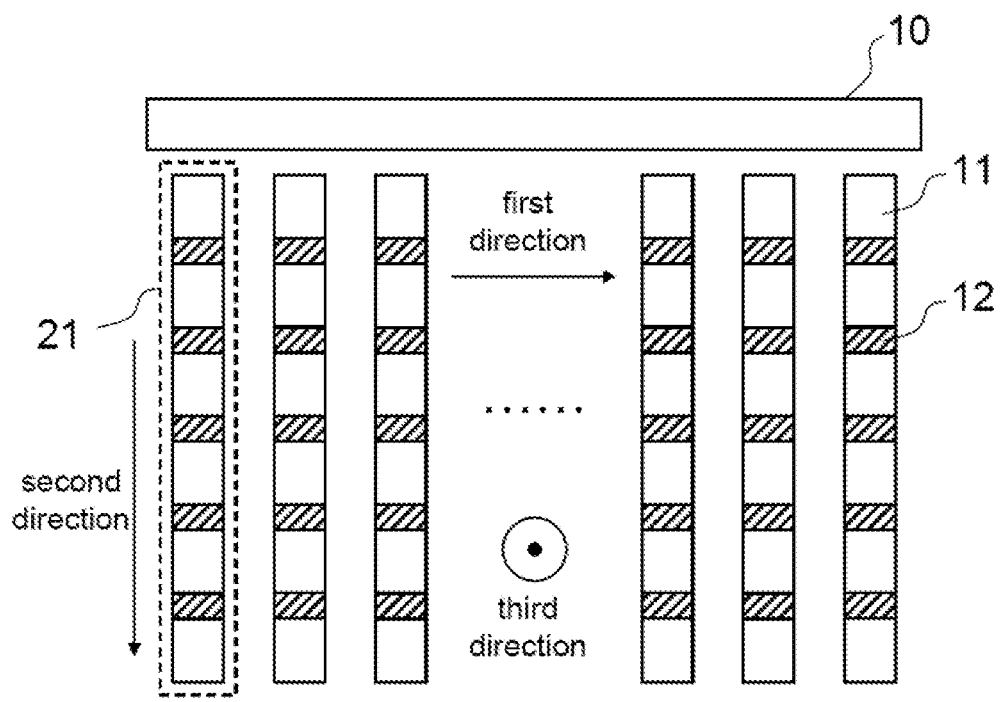
FIG. 1 is a structural schematic diagram of a backlight module provided by an embodiment of the present invention.

The embodiments of the present invention provide a backlight module, a liquid crystal display device and a display; laser is used as the light source of the backlight module, improving the utilization of light and realizing high color gamut display.

In the following, the technical solutions in embodiments of the invention will be described clearly and completely in connection with the drawings in the embodiments of the invention. Obviously, the described embodiments are only part of the embodiments of the invention, and not all of the embodiments. Based on the embodiments in the invention, all other embodiments obtained by those of ordinary skills in the art under the premise of not paying out creative work pertain to the protection scope of the invention.

The liquid crystal display devices provided by the embodiments will be described below in detail in connection with the drawings.

The shapes and thickness of the film layers in the drawings do not reflect the real scale of the film layers, but to schematically illustrate the content of the invention.

As shown in FIG. 1, an embodiment of the present invention provides a backlight module, which can be used in a liquid crystal display device. The liquid crystal display device can comprise a liquid crystal display panel (not shown) and the backlight module; the liquid crystal display panel can be provided on a light emitting direction of the backlight module.

In this embodiment, the backlight module comprises a laser light source 10 and several light guide devices 21 provided on a light output side of the laser light source 10; the several light guide devices 21 are arranged in a first direction; each light guide device 21 comprises several light guide elements 11 and transflective films 12 arranged alternately in a second direction; the transflective films 12 are configured to reflect laser from the laser light source 10 into a third direction; the third direction is perpendicular to the first direction and the second direction.

In the embodiment of the present invention, a laser light source is used as the light source of the backlight module; the utilization of light is thus improved due to good directivity of laser, realizing high color gamut display, without causing defects such as cross color. Moreover, in the embodiment of the present invention, light guiding is realized by applying the light guide device with a simple structure, which light guide device is formed by connecting a light guide element with a transflective film.

As can be understood by those skilled in the art, based on the arrangement of the sub-pixels in the liquid crystal display panel, the first direction and the second direction can be perpendicular to each other; alternatively, a specific angle can also be set between the first direction and the second direction, thereby realizing the correspondence between each transflective film 12 and each sub-pixel.

Figure 2:
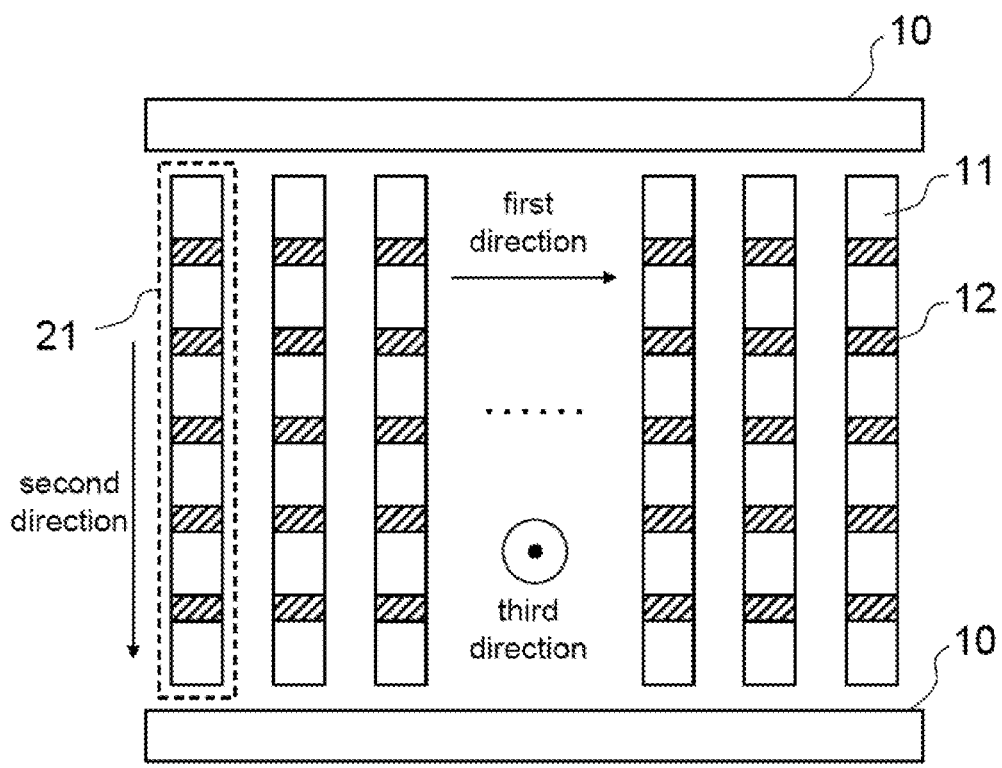
FIG. 2 is a structural schematic diagram of a backlight module provided by another embodiment of the present invention.

Optionally, as shown in FIG. 2, the backlight module may comprise two laser light sources 10; the several light guide devices 21 are provided between these two laser light sources 10.

With two laser light sources, higher light power and more light colors can be achieved. In FIG. 2, two laser light sources 10 are provided on the upper side and the lower side of the several light guide devices 21. As can be understood by those skilled in the art, the backlight module shown in FIG. 2 can also be rotated 90 degrees along the third direction, then the backlight modules shown in FIG. 6 and FIG. 8(b) can be obtained, thereby realizing a flexible matching with the sub-pixels in the liquid crystal display panel 20.

Optionally, with the increase of a distance between the transflective film and the laser light source, reflectance of the transflective film increases, transmittance of the transflective film decreases.

To enhance the light homogeneity of the liquid crystal display device, with the increase of a distance between the transflective film in the light guide device and the laser light source, reflectance of the transflective film increases, transmittance of the transflective film decreases.

Optionally, the reflectance and transmittance of the transflective film can be adjusted by adding reflective particles into the transflective film: the higher the reflectance of the transflective film is, the greater a concentration of reflective particles contained in the transflective film is.

Figure 8A:
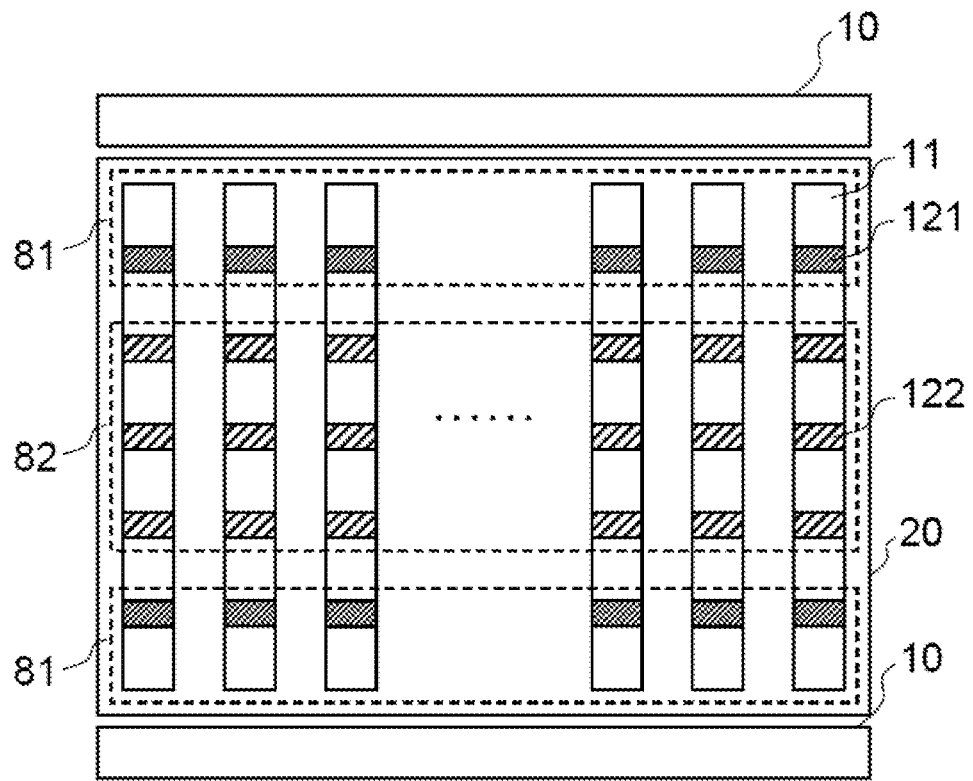
FIG. 8(a) and FIG. 8(b) are structural schematic diagrams of liquid crystal display devices provided by the embodiments of the present invention.
Figure 8B:
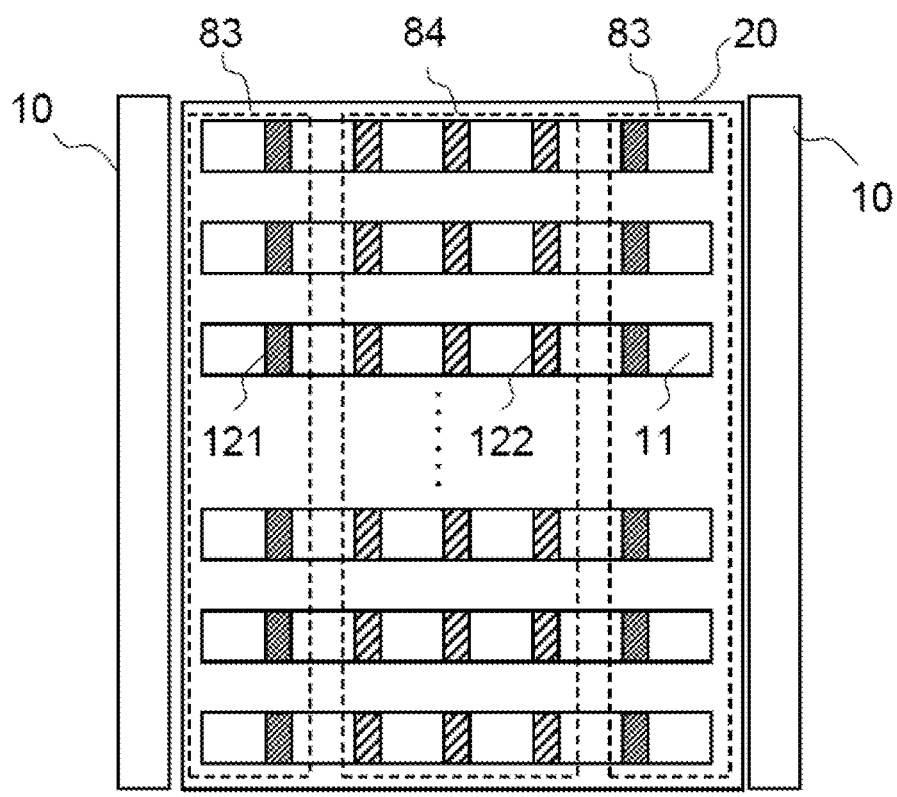

As shown in FIG. 8(a), proximal transflective films 121 are provided in a region 81 corresponding to the upper region and lower region of the liquid crystal display panel 20; remote transflective films 122 are provided in a region 82 corresponding to the middle region of the liquid crystal display panel 20. As shown in FIG. 8(b), proximal transflective films 121 are provided in a region 83 corresponding to the left region and right region of the liquid crystal display panel 20; remote transflective films 122 are provided in a region 84 corresponding to the middle region of the liquid crystal display panel 20. In the embodiment of the present invention, the reflectance of the proximal transflective films 121 is less than that of the remote transflective films 122. In an implementation, the size and location of the region 81, region 82, region 83 and region 84 can be designed based on the actual requirements of production process and user requirements.

In FIG. 8(a), the region 81 is close to the laser light source 10; the region 82 is far away from the laser light source 10; a certain degree of attenuation will occur in the process of laser propagation; therefore, the light intensity of laser in the region 82 is less than the light intensity of laser in the region 81. Since the reflectance of the proximal transflective films 121 is less than that of the remote transflective films 122, the light intensity of the reflected light in the region 81 is substantially equal to the light intensity of the reflected light in the region 82, improving the brightness uniformity of the liquid crystal display device.

Similarly, in FIG. 8(b), the light intensity of the reflected light in the region 83 is substantially equal to the light intensity of the reflected light in the region 84, the brightness uniformity of the liquid crystal display device is thus improved. In an implementation, the reflectance and transmittance of the proximal transflective films and the reflectance and transmittance of the remote transflective films can be predetermined based on the actual operational environment and user requirements.

In a practical design, based on the size of the screen, uniform requirements and so on, the liquid crystal display panel in FIG. 8 (a) or FIG. 8 (b) can be divided into a plurality of regions. For example, the liquid crystal display panel in FIG. 8 (a) can also be divided into regions 81, 82, 83 (not shown in FIG. 8(a)), the reflectance and transmittance of the transflective films in each region gradually change, thereby achieving more precise adjustment. The general design principle is that with the increase of the distance between the transflective film and the light source, the reflectance increases, and the transmittance decreases.

Figure 3:
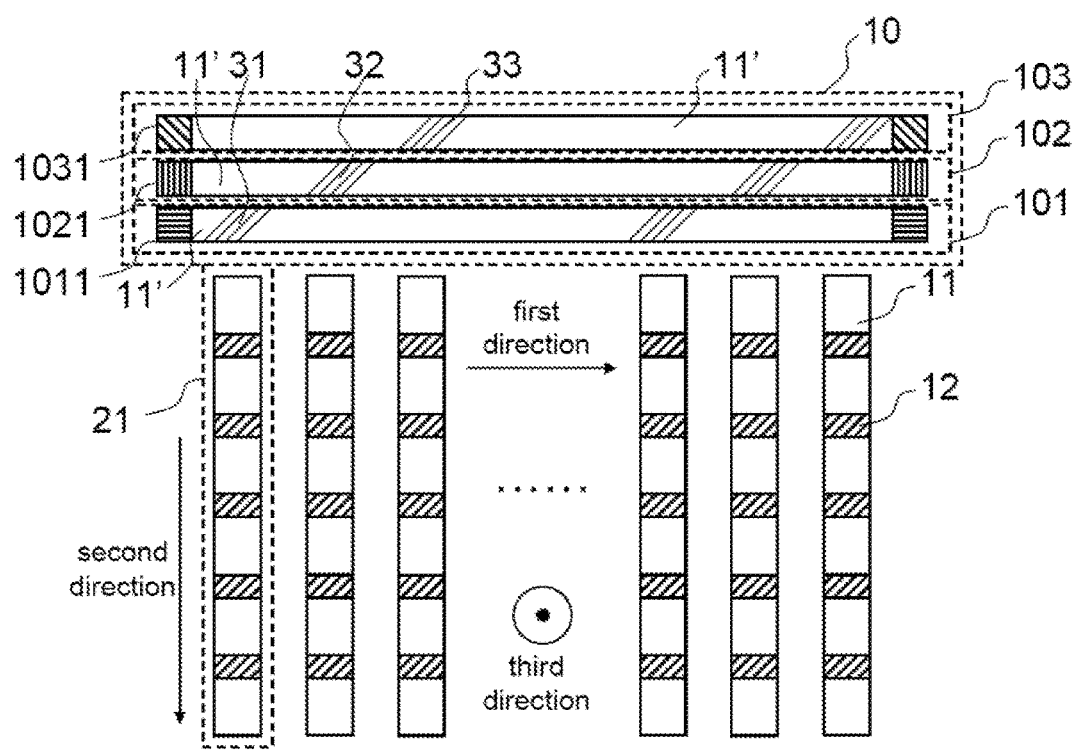
FIG. 3 is a structural schematic diagram of a laser light source provided by an embodiment of the present invention.
Figure 4:
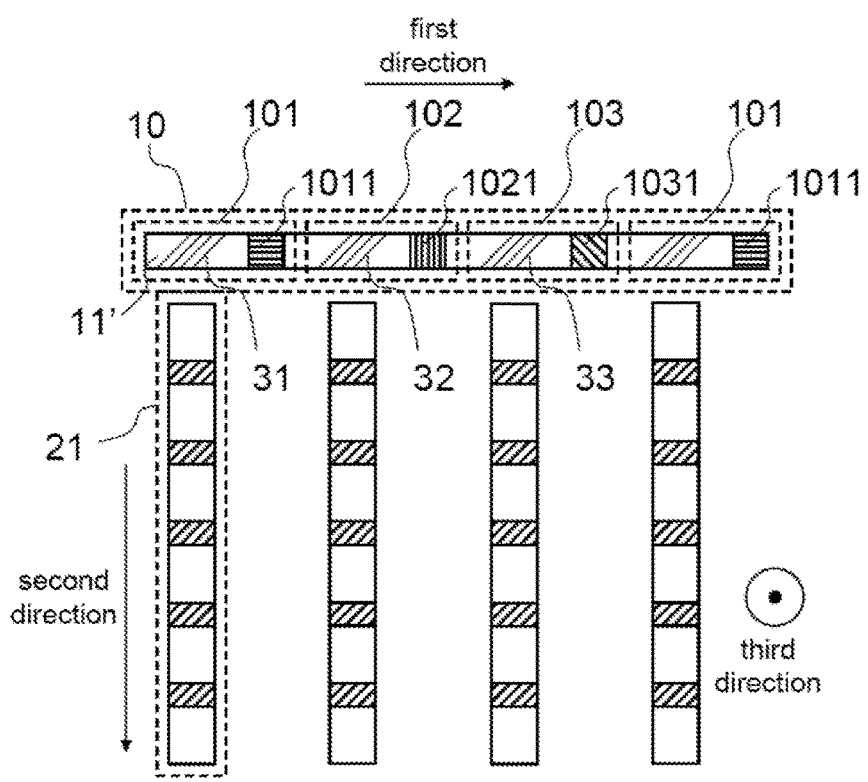
FIG. 4 is a structural schematic diagram of a laser light source provided by another embodiment of the present invention.

Optionally, as shown in FIG. 3 and FIG. 4, the laser light source 10 comprises a red laser light source 101, a green laser light source 102 and a blue laser light source 103; the red laser light source 101 comprises: at least one red semiconductor laser 1011 for emitting red laser, and several light guide elements 11' for light source and first transflective films 31 arranged alternately in a light emitting direction of the red semiconductor laser 1011; the green laser light source 102 comprises: at least one green semiconductor laser 1021 for emitting green laser, and several light guide elements 11' for light source and second transflective films 32 arranged alternately in a light emitting direction of the green semiconductor laser 1021; the blue laser light source 103 comprises: at least one blue semiconductor laser 1031 for emitting blue laser, and several light guide elements 11' for light source and third transflective films 33 arranged alternately in a light emitting direction of the blue semiconductor laser 1031.

With such an arrangement, light colors of red green and blue are provided, thereby realizing color display. In the embodiments of the present invention, the sub-pixels of the liquid crystal display panel comprise red (R) sub-pixels, green (G) sub-pixels and blue (B) sub-pixels. In a practical application, the sub-pixels of the liquid crystal display panel can also comprise sub-pixels of other colors, such as yellow (Y) sub-pixels and white (W) sub-pixels. A color filter layer is not required in the liquid crystal display panel in the embodiment of the present invention; sub-pixels with different colors can be realized by applying laser light sources with different colors.

Optionally, as shown in FIG. 3, the red laser light source 101, green laser light source 102 and blue laser light source 103 are arranged in the second direction; each one of the first transflective films 31, second transflective films 32 and third transflective films 33 corresponds to one light guide device 21 respectively.

Optionally, as shown in FIG. 4, the red laser light source 101, green laser light source 102 and blue laser light source 103 are arranged in the first direction; each one of the first transflective films 31, second transflective films 32 and third transflective films 33 corresponds to one light guide device 21 respectively.

With such an arrangement, the location of the laser light source can be predetermined based on the specific requirements of the liquid crystal display device, making the design more flexible.

Figure 6:
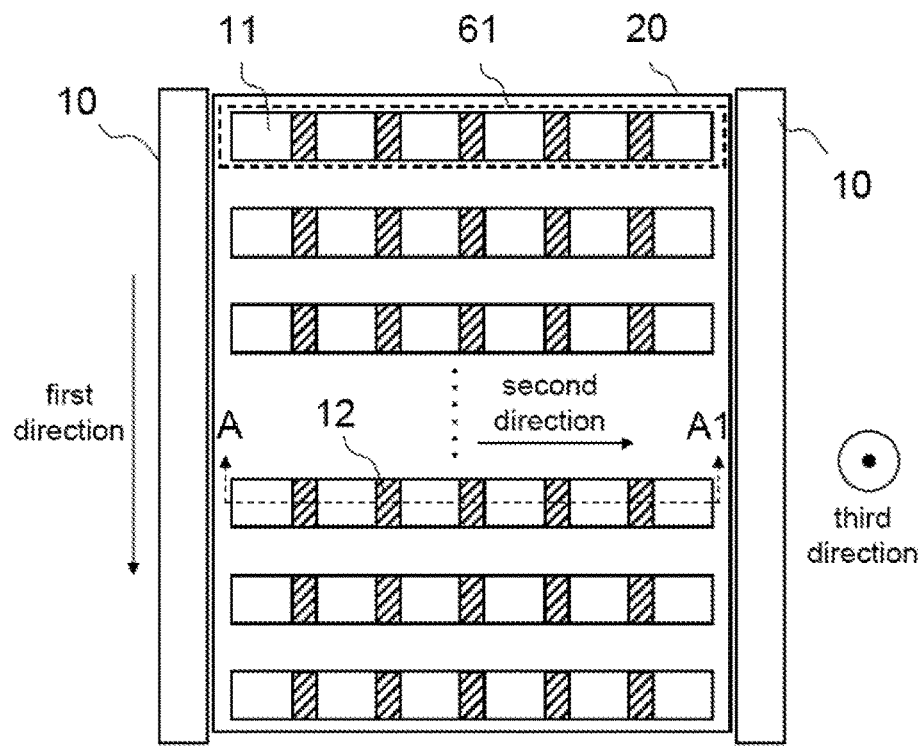
FIG. 6 is a structural schematic diagram of a liquid crystal display device provided by an embodiment of the present invention.
Figure 7:
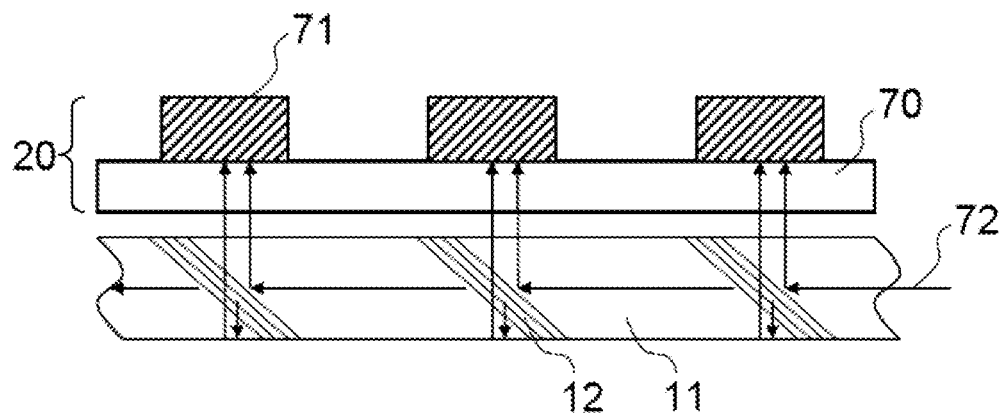
FIG. 7 is a structural schematic diagram of a liquid crystal display device provided by an embodiment of the present invention, showing a cross section along the line A-A1 in FIG. 6.

Optionally, as shown in FIG. 6 and FIG. 7, a cross section shape of the light guide element 11 is parallelogram; the cross section is parallel to the second direction and the third direction. The cross section shape of the light guide element is designed as a parallelogram; therefore the shape of the light guide device 21 comprising the light guide elements 11 and transflective films 12 is regular, simplifying the design.

FIG. 3 only shows the laser light source located on a side of the backlight module; the arrangement of a laser light source located on another side of the backlight module is basically same with that of the above mentioned laser light source, which will not be introduced in detail herein. In an implementation, as shown in FIG. 3, for an embodiment of the present invention, the red laser light source 101 can comprise two red semiconductor lasers 1011 for emitting red laser, which are located on both sides of the structure formed by the light guide elements 11' and the first transflective films 31; the green laser light source 102 can comprise two green semiconductor lasers 1021 for emitting green laser, which are located on both sides of the structure formed by the light guide elements 11' and the second transflective films 32; the blue laser light source 103 can comprise two blue semiconductor lasers 1031 for emitting blue laser, which are located on both sides of the structure formed by the light guide elements 11' and the third transflective films 33.

The red laser light source 101, green laser light source 102 and blue laser light source 103 in an embodiment of the present invention can also be arranged in a manner shown in FIG. 4. Red laser emitted by the red semiconductor laser 1011 of the red laser light source 101 propagates along the light guide elements 11' for light source. When arrives at the first transflective films 31, a part of the red laser is reflected and propagates in the light guide device 21 of the embodiment of the present invention. In a practical design, by adding a large number of reflective particles into the first transflective films 31 and adjusting the refractive index of the light guide elements 11' for light source, most of the red laser is reflected at the interface between the light guide element 11' for light source and the first transflective films 31, then enters the light guide device 21, providing a backlight for the liquid crystal display panel.

Similarly, the arrangement of the green laser light source 102 and blue laser light source 103 can be same with the arrangement of the red laser light source 101. Compared with the design of the embodiment shown in FIG. 3, a large number of red semiconductor lasers, green semiconductor lasers and blue semiconductor lasers are required. Though the design is relatively complex and the cost is relatively high, it can still be realized in an implementation.

In the embodiment of the present invention, a red semiconductor laser, a green semiconductor laser and a blue semiconductor laser are applied in the laser light source. Due to an excellent directivity of the laser light source, a precise alignment can be realized; a color filter layer is not required in a liquid crystal display panel any more, realizing color display with high quality and high color gamut.

An embodiment of the present invention also provides a liquid crystal display device. As shown in FIGS. 6-8(*b*), the liquid crystal display device comprises a liquid crystal display panel 20 and the above mentioned backlight module; the liquid crystal display panel 20 is provided on a light output side of the backlight module; the normal direction of the liquid crystal display panel 20 is parallel to the third direction.

In the embodiment of the present invention, a laser light source is used as the light source of the backlight module; the utilization of light is thus improved due to good directivity of laser, realizing high color gamut display, without causing defects such as cross color. Moreover, in the embodiment of the present invention, light guiding is realized by applying the light guide device with a simple structure, which light guide device is formed by connecting a light guide element with a transflective film.

Optionally, the liquid crystal display panel comprises a plurality of sub-pixels arranged in an array; each sub-pixel corresponds to one transflective film.

With such an arrangement, a controllable light beam can be provided to each sub-pixel. Normal display can be achieved; the output of the laser light source can also be selectively reduced or shut off during a dark state of a certain sub-pixel, saving energy.

Figure 5:
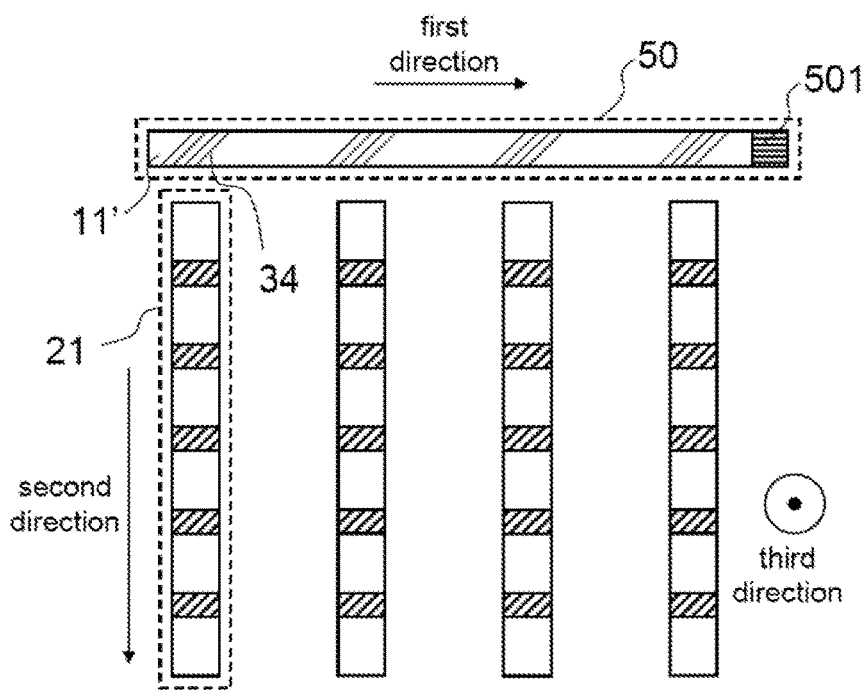
FIG. 5 is a structural schematic diagram of a laser light source provided by yet another embodiment of the present invention.

Optionally, the liquid crystal display panel in the embodiment of the present invention can also be a conventional liquid crystal display panel. The liquid crystal display panel may comprise a red color filter layer, a green color filter layer and a blue color filter layer; as shown in FIG. 5, the laser light source is a white laser light source 50; the white laser light source 50 comprises: at least one white semiconductor laser 501 for emitting white laser, and several light guide elements 11' for light source and fourth transflective films 34 arranged alternately in a light emitting direction of the white semiconductor laser 501.

Several other designs for the laser light source are introduced in the embodiments of the invention. The liquid crystal display panel provided by an embodiment of the present invention may also comprise any one of a red color filter layer, a blue color filter layer and a green color filter layer; the laser light source may comprise laser light sources with the other two colors and a white laser light source. For example, the liquid crystal display panel comprises a red color filter layer; the laser light source comprises a blue laser light source, a green laser light source and a white laser light source. In a specific setting, the blue laser light source and the green laser light source can be provided in the manner shown in FIG. 3; the white laser light source can be provided in the manner of the red laser light source shown in FIG. 3, by replacing the red laser light source in the red semiconductor laser with a white semiconductor laser.

The liquid crystal display panel provided by an embodiment of the present invention may also comprise any two of a red color filter layer, a blue color filter layer and a green color filter layer; the laser light source may comprise a laser light source with the other one color and a white laser light source. For example, the liquid crystal display panel comprises a red color filter layer and a blue color filter layer; the laser light source comprises a green laser light source and a white laser light source. In a specific setting, the green laser light source can be provided in the manner shown in FIG. 3; the white laser light source can be provided in the manner of the red laser light source and the blue laser light source shown in FIG. 3, by replacing the red laser light source in the red semiconductor laser and the blue laser light source in the blue semiconductor laser with white semiconductor lasers.

With the above mentioned different settings for laser light sources, selection for the laser light source is more flexible.

As shown in FIG. 6, in an embodiment of the invention, the liquid crystal display panel 20 may comprise a plurality of sub-pixels arranged in an array (not shown). The setting for the sub-pixels in the liquid crystal display panel provided by the embodiment of the invention may be same with the prior art, which will not be described in detail.

In the embodiment shown in FIG. 6, the laser light source 10 can also comprise a red laser light source, a green laser light source and a blue laser light source; the specific setting for the red laser light source, green laser light source and blue laser light source can be similar to the settings of the embodiments as shown in FIG. 3 and FIG. 4; each one of the first transflective films 31, second transflective films 32 and third transflective films 33 corresponds to one light guide device 61 respectively, which will not be described in detail.

Referring to FIG. 6, a liquid crystal display device is introduced to illustrate how to provide backlight for the liquid crystal display panel when a laser light source is used as a backlight source in an embodiment of the invention.

In particular, FIG. 7 is a structural schematic diagram of a liquid crystal display device provided by an embodiment of the present invention, showing a cross section along the line A-A1 in FIG. 6. The liquid crystal display panel in the embodiment of the invention comprises a basal substrate 70 and R sub-pixels 71 located on the basal substrate 70. Optionally, each transflective film 12 is provided corresponding to one sub-pixel. Optionally, as shown in FIG. 6 and FIG. 7, a cross section shape of the light guide element 11 is parallelogram, the cross section being parallel to the second direction and the third direction. The cross section shape of the light guide element is designed as a parallelogram, therefore the shape of the light guide device 21 comprising the light guide elements 11 and transflective films 12 is regular, simplifying the design.

As shown in FIG. 7, a red laser beam 72 emitted from a red laser light source enters into the light guide device formed by connecting the light guide elements 11 and transflective films 12. When the red laser beam 72 arrives at the transflective films 12, a part of the laser beam is reflected into the R sub-pixels 71, and a part of the laser beam propagates forward. In addition, during the propagation, when the red laser beam 72 enters into the transflective film 12 from the light guide element 11, a small part of the laser beam is diffused (as indicated with the down arrows in FIG. 7); the diffused laser beam is reflected and then enters into the R sub-pixel 71.

As can be seen from FIG. 7, most of the red laser beam 72 emitted from the red laser light source can enter into the R sub-pixels 71, thereby providing backlight for the R sub-pixels 71. In the embodiment of the present invention, a laser light source is used as the light source of the backlight module; the utilization of light is thus improved due to good directivity of laser, realizing high color gamut display, without causing defects such as cross color. Moreover, in the embodiment of the present invention, light guiding is realized by applying the light guide device with a simple structure, which light guide device is formed by connecting a light guide element with a transflective film.

In the embodiment of the present invention, the principle of providing backlight for the G sub-pixels and B sub-pixels is same with the principle of providing backlight for the R sub-pixels, which will not be repeated herein. By applying a red laser light source, green laser light source and blue laser light source in the embodiment of the invention, a color filter layer is not required in a liquid crystal display panel any more, realizing color display with high quality and high color gamut.

An embodiment of the present invention also provides a display. The display comprises the above mentioned liquid crystal display device. The display can be a display device such as liquid crystal display, liquid crystal TV, organic light emitting diode (OLED) display, OLED TV and electronic paper.

To sum up, the embodiments of the present invention provide a backlight module, a liquid crystal display device and a display; laser is used as the light source of the backlight module, improving the utilization of light and realizing high color gamut display. The backlight module comprises a laser light source and several light guide devices provided on a light output side of the laser light source; the several light guide devices are arranged in a first direction; each light guide device comprises several light guide elements and transflective films arranged alternately in a second direction; the transflective films are configured to reflect laser from the laser light source into a third direction; the third direction is perpendicular to the first direction and the second direction. In the embodiment of the present invention, a laser light source is used as the light source of the backlight module; the utilization of light is thus improved due to good directivity of laser, realizing high color gamut display, without causing defects such as cross color. Moreover, in the embodiment of the present invention, light guiding is realized by applying the light guide device with a simple structure, which light guide device is formed by connecting a light guide element with a transflective film.

Apparently, the person skilled in the art may make various alterations and variations to the invention without departing the spirit and scope of the invention. As such, provided that these modifications and variations of the invention pertain to the scope of the claims of the invention and their equivalents, the invention is intended to embrace these alterations and variations.

What is claimed is:

1. A backlight module, comprising a laser light source and several light guide devices provided on a light output side of the laser light source; the several light guide devices being arranged in a first direction;
    wherein each light guide device comprises several light guide elements and transflective films arranged alternately in a second direction;
    wherein the transflective films is configured to reflect laser from the laser light source into a third direction; the third direction is perpendicular to the first direction and the second direction;
    wherein the laser light source comprises a red laser light source, a green laser light source and a blue laser light source;
    wherein the red laser light source comprises: at least one red semiconductor laser for emitting red laser, and several light guide elements for light source and first transflective films arranged alternately in a light emitting direction of the red semiconductor laser; the green laser light source comprises: at least one green semiconductor laser for emitting green laser, and several light guide elements for light source and second transflective films arranged alternately in a light emitting direction of the green semiconductor laser; the blue laser light source comprises: at least one blue semiconductor laser for emitting blue laser, and several light guide elements for light source and third transflective films arranged alternately in alight emitting direction of the blue semiconducting laser;
    and wherein the red laser light source, green laser light source and blue laser light source are arranged in the second direction; and wherein each one of the first transflective films, second transflective films and third transflective films corresponds to one light guide device respectively.

2. The backlight module according to claim 1, wherein the backlight module comprises two laser light sources; and wherein the several light guide devices are provided between these two laser light sources.

3. The backlight module according to claim 1, wherein with the increase of a distance between the transflective film and the laser light source, reflectance of the transflective film increases, transmittance of the transflective film decreases.

4. The backlight module according to claim 3, wherein the higher the reflectance of the transflective film is, the greater a concentration of reflective particles contained in the transflective film is.

5. The backlight module according to claim 1, wherein a cross section shape of the light guide element is parallelogram, the cross section being parallel to the second direction and the third direction.

6. A liquid crystal display device, comprising a liquid crystal display panel and the backlight module according to claim 1; wherein the liquid crystal display panel is provided on a light output side of the backlight module; the normal direction of the liquid crystal display panel is parallel to the third direction.

7. The liquid crystal display device according to claim 6, wherein the liquid crystal display panel comprises a plurality of sub-pixels arranged in an array; each sub-pixel corresponds to one transflective film.

8. The liquid crystal display device according to claim 6, wherein the liquid crystal display panel comprises a red color filter layer, a green color filter layer and a blue color filter layer; wherein the laser light source is a white laser light source; and wherein the white laser light source comprises: at least one white semiconductor laser for emitting white laser, and several light guide elements for light source and fourth transflective films arranged alternately in a light emitting direction of the white semiconductor laser.

9. The liquid crystal display device according to claim 6, wherein the backlight module comprises two laser light sources; and wherein the several light guide devices are provided between these two laser light sources.

10. The liquid crystal display device according to claim 6, wherein with the increase of a distance between the transflective film and the laser light source, reflectance of the transflective film increases, transmittance of the transflective film decreases.

11. The liquid crystal display device according to claim 10, wherein the higher the reflectance of the transflective film is, the greater a concentration of reflective particles contained in the transflective film is.

12. The liquid crystal display device according to claim 6, wherein a cross section shape of the light guide element is parallelogram, the cross section being parallel to the second direction and the third direction.

13. A display comprising the liquid crystal display device according to claim 6.

* * * * *